Figures 1, 2:
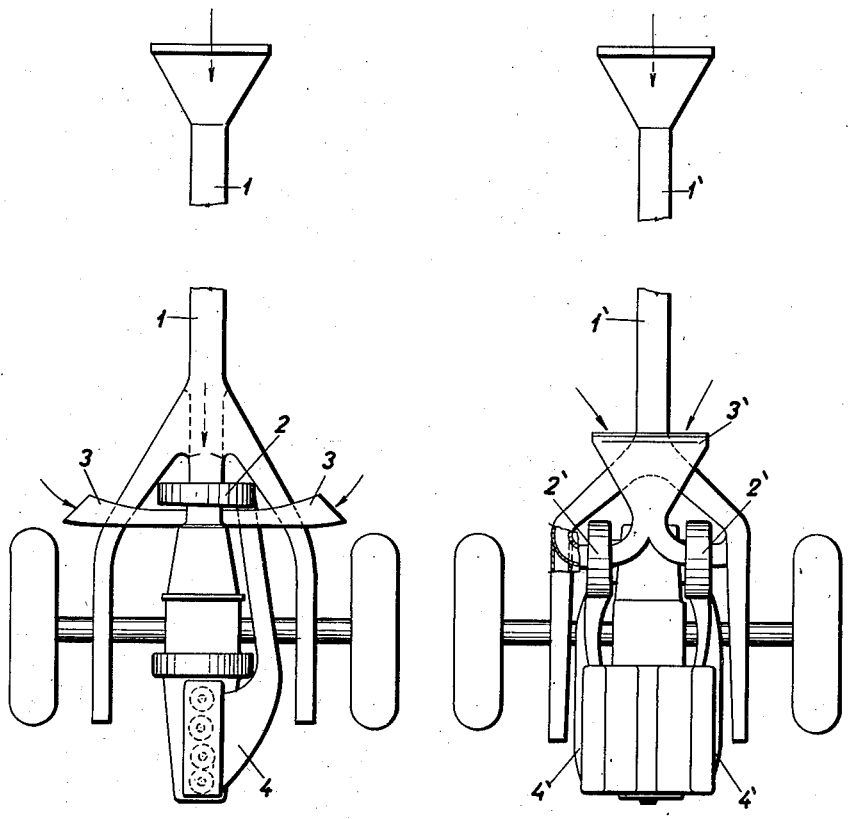

Patented May 6, 1941

2,241,037

UNITED STATES PATENT OFFICE 2,241,037

VEHICLE HAVING AIR COOLED ENGINES AT THE REAR THEREOF

Miloš Klavík, Prague-Smichov, Czechoslovakia

Application February 21, 1940, Serial No. 320,197
In Czechoslovakia June 14, 1938

6 Claims. (Cl. 180—54)

The present invention relates to vehicles having air cooled engines at the rear thereof and more particularly to the supply of cooling air to the engines of such vehicles.

One object of the invention is to provide a vehicle having an air cooled engine at the rear thereof in which cooling air is supplied to the engine by one or more double inlet blowers, one inlet of which is fed from an induction opening or openings in the front part of the vehicle and the other from an induction opening or openings in the rear part of the vehicle.

A further object of the invention is to provide a vehicle having an air cooled engine at the rear thereof in which cooling air is supplied to the engine by one or more double blowers each having an inlet on each side thereof, the inlet on one side being fed from an induction opening or openings in the front part of the vehicle and the inlet on the other side being fed from an induction opening or openings in the rear part of the vehicle.

Each blower may have a single discharge opening.

The invention is more particularly described with reference to the accompanying drawing in which:

Figure 1 is a diagrammatic plan view illustrating one mode of carrying the invention into effect and Figure 2 is a similar view of an alternative arrangement.

In Fig. 1 there is shown an engine which is mounted in the rear part of the vehicle of which the central hollow chassis member 1 is widened at the front in the shape of a funnel and supplies the air in the direction of the rotor to one side of the double blower 2. Air is supplied to the other side of the blower through funnel-shaped openings 3 from recesses in the side walls which define the engine space or compartment.

From the common discharge opening of the blower 2 a duct 4 conveys the cooling air to the cylinders of the engine.

In Fig. 2 is illustrated diagrammatically an engine having its cylinders disposed in V-formation. Here also, a central hollow chassis member 1' conducts the air to two double blowers 2' each having inlets on both sides. The blowers 2' are disposed at opposite sides of the gear box. The outer inlet branches of the blowers are advantageously connected to the hollow bifurcated ends of the hollow chassis member 1' by which the driving unit, including the engine, is supported. The inner inlet branches of the blowers are connected to the funnel-shaped openings 3', which supply the air from the openings in the upper wall of the casing which encloses the engine. Both blowers discharge the cooling air through the ducts 4' to the cylinders of the engine.

The examples of construction described may naturally be altered in different ways as to constructional details without departing from the spirit and scope of the invention as defined by the claims.

I declare that what I claim is:

1. In a vehicle having an air cooled engine disposed at the rear thereof, at least one double inlet blower for supplying cooling air to the engine, an induction system connected to one of the inlets of the blower and leading to the front part of the vehicle and an induction system in the rear part of the vehicle connected to the other inlet of the blower.

2. In a vehicle having an air cooled engine disposed at the rear thereof, at least one double inlet blower for supplying cooling air to the engine, an induction system connected to one of the inlets of the blower and leading to the front part of the vehicle, an induction system in the rear part of the vehicle connected to the other inlet of the blower and a single discharge main for said blower.

3. In a vehicle having an air cooled engine disposed at the rear thereof, at least one double blower for supplying cooling air to the engine, said blower having an inlet on each side thereof, an induction system connected to one of the inlets of the blower and leading to the front part of the vehicle and an induction system in the rear part of the vehicle connected to the other inlet of the blower.

4. In a vehicle having an air cooled engine disposed at the rear thereof, at least one double blower for supplying cooling air to the engine, said blower having an inlet on each side thereof, an induction system connected to one of the inlets of the blower and leading to the front part of the vehicle, an induction system in the rear part of the vehicle connected to the other inlet of the blower and a single discharge main for said blower.

5. In a vehicle according to claim 1, a hollow main chassis member constituting at least part of said induction system leading to the front part of the vehicle.

6. In a vehicle according to claim 3, a hollow main chassis member constituting at least part of said induction system leading to the front part of the vehicle.

MILOŠ KLAVÍK.